United States Patent [19]

Morawski et al.

[11] Patent Number: 4,570,949
[45] Date of Patent: Feb. 18, 1986

[54] CHUCK

[76] Inventors: Longine V. Morawski; Lawrence V. Morawski, both of P.O. Box 631, Roseville, Mich. 48066

[21] Appl. No.: 624,921

[22] Filed: Jun. 27, 1984

[51] Int. Cl.$^4$ .................. B23B 31/16; B23B 31/40
[52] U.S. Cl. .................. 279/1 DA; 279/2 R; 279/110; 279/123
[58] Field of Search .......... 279/1 J, 2 R, 6, 16, 279/17, 60, 110, 123, 1 L, 1 DA, 121, 61–65, 111–120, 122; 82/DIG. 6, 40 R; 409/903, 233

[56] References Cited

U.S. PATENT DOCUMENTS

| 1,578,163 | 3/1926 | Muehleib | 279/2 R X |
| 2,905,477 | 9/1959 | Buck et al. | 279/123 |
| 3,604,717 | 9/1971 | Hohwart | 279/1 J X |
| 3,610,642 | 10/1971 | Fischer et al. | 279/71 X |
| 3,633,929 | 1/1972 | Morawski et al. | 279/1 J |
| 3,751,053 | 8/1973 | Swanson | 279/1 L X |
| 3,833,229 | 9/1974 | Hohwart et al. | 279/60 X |
| 4,496,165 | 1/1985 | Schrekeis et al. | 279/123 X |

Primary Examiner—Z. R. Bilinsky
Assistant Examiner—Steven C. Bishop
Attorney, Agent, or Firm—Barnes, Kisselle, Raisch, Choate, Whittemore & Hulbert

[57] ABSTRACT

A workpiece chuck has a plurality of support blocks adapted to be mounted on the front face of the chuck body in circumferentially spaced relation and at various locations spaced radially different distances from the central axis of the chuck. Within each support block a jaw rod is arranged for sliding movement along an axis inclined at an acute angle to the central axis of the chuck. A coupling interconnects the inner end of each jaw rod with an axially displaceable puller plate within the chuck body. The front plate of the chuck and the puller plate are formed with registering, radially elongated openings to permit radial adjustment of the jaw rods and to enable them to be retracted outwardly from the chuck body together with their support blocks.

7 Claims, 5 Drawing Figures

CHUCK

This invention relates to a drawbar actuated chuck for rotatably supporting a workpiece.

Heretofore there have been proposed chucks having workpiece-engaging jaws mounted at the forward ends of rods slideably arranged in a chuck body at an angle inclined to the rotary axis of the chuck. The rods are adapted to be reciprocated by means of a drawbar actuated puller plate having a sliding connection with the inner ends of the rods to cause the jaws to grip and release a workpiece. While such chucks are used extensively, one such chuck is not adapted for supporting workpieces of substantially different sizes and shapes. This shortcoming arises primarily from the fact that with chucks of this design the maximum radial displacement of each jaw is relatively small, normally only a few hundred thousandths of an inch. Likewise, a chuck of this type is designed for gripping a workpiece around either its outer diameter or its inner diameter, but not both.

The primary object of this invention is to enable chucks of the type described to be used for gripping workpieces which vary considerably in size and configuration.

A more specific object of this invention is to provide a chuck of the type described in which the jaw rods can be supported on the chuck body at various locations spaced radially different distances from the central axis of the chuck body and can also be mounted on the chuck body in either of two positions rotated 180° relative to each other so as to be capable of gripping a workpiece on either its inner or its outer diameter.

The above objects are accomplished by supporting the jaw rods on individual support blocks which are in turn designed to be mounted on the front face of the chuck in reversely oriented positions and also at a plurality of locations spaced radially different distances from the central axis of the chuck. The front face of the chuck body on which the support blocks are mounted and the drawbar actuated puller plate are formed with openings which register with the inner ends of the jaw rods and couplings which connect the jaw rods with the puller plate. These openings are elongated radially sufficiently to accommodate the couplings throughout the range of radial positions and orientation of the support block.

Other objects, features and advantages of the present invention will become apparent from the following description and accompanying drawings, in which.

Figure 1:
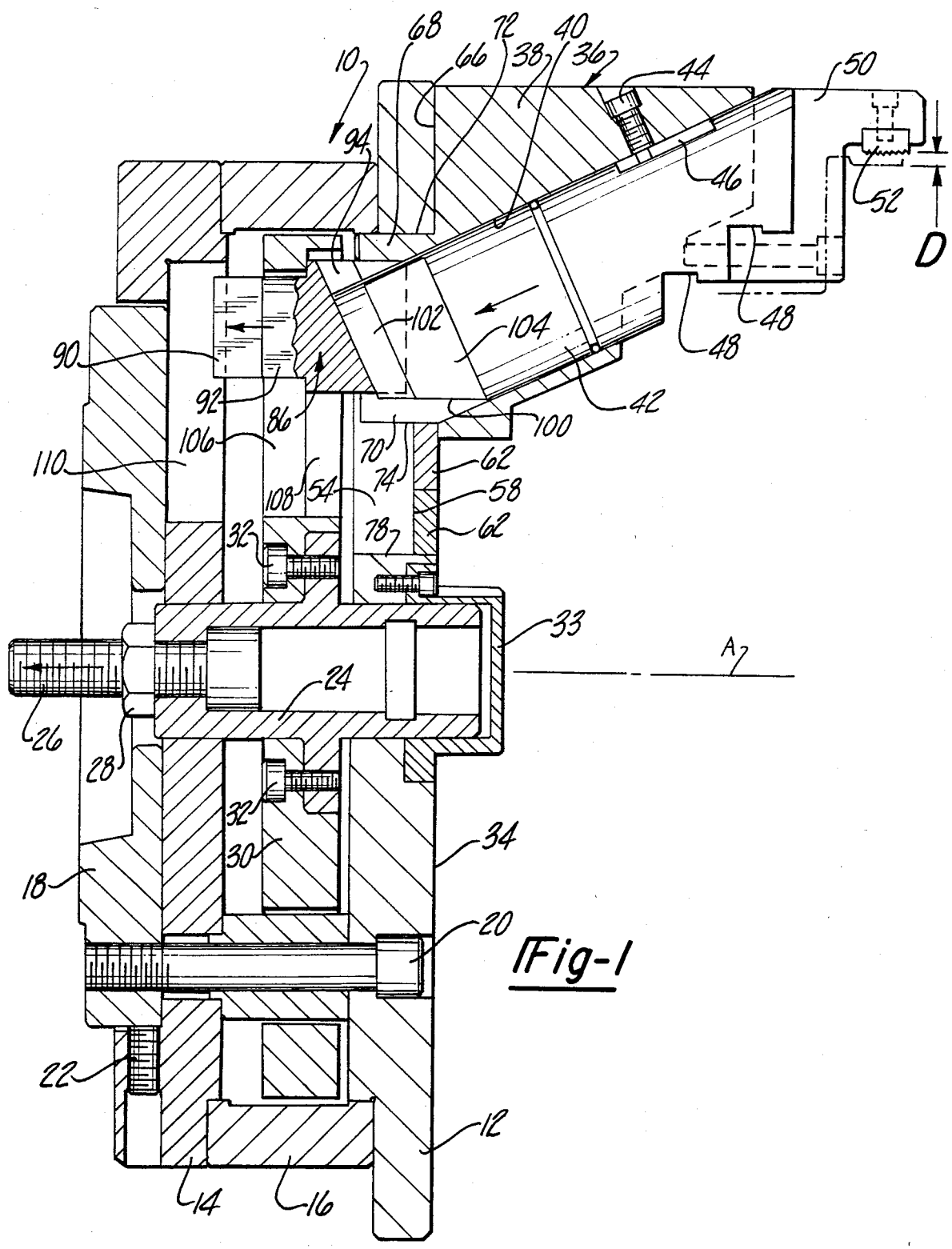
FIG. 1 is a vertical sectional view of a chuck according to the present invention taken along the line 1—1 in FIG. 2.

In FIG. 1 the chuck illustrated has a body 10 formed by a front plate 12 and a rear plate 14 held in axially spaced apart relation by an outer spacer ring 16. Plates 12 and 14 are rigidly secured together and to a spindle adaptor plate 18 by means of screws 20. The rotary axis of the spindle is designated A. Body 10 is adapted to be mounted on adaptor 18 in a position accurately concentric with axis A by means of a plurality of adjusting screws 22. Within body 10 there is arranged a rod adaptor 24 concentric with the axis A. Rod adaptor 24 is connected by a screw 26 and a nut 28 with an axially shiftable drawbar (not illustrated) in the spindle. A puller plate 30 between plates 12 and 14 is secured to rod adaptor 24 by means of screws 32. Thus, puller plate 30 is displaced axially within body 10 in response to axial reciprocation of the drawbar spindle. Front plate 12 is centrally apertured to accommodate adaptor 24, the aperture being closed by a cap 33.

On the front face 34 of front plate 12 there is mounted a plurality of jaw assemblies 36. Only a single jaw assembly 36 is illustrated in the drawings. Preferably, three such assemblies would be mounted on the chuck body and spaced equally circumferentially therearound. Each jaw assembly 36 includes a support block 38 having a cylindrical bore 40 therein inclined at an acute angle to the axis A. within each bore 40 there is slideably arranged a cylindrical jaw rod 42. A screw 44 in support block 38 engages a longitudinal groove 46 in the jaw rod 42 to prevent rotation of the jaw rod about its central axis. Adjacent the outer end of the jaw rod it is formed with a plurality of stepped surfaces 48 for mounting a plurality of different jaws thereon at locations spaced radially different distances from the axis A. In FIG. 1 a specific jaw 50 is illustrated and in FIG. 4 a different jaw 50a is shown in broken lines mounted on the jaw rod so that the work-gripping inserts 52 at the outer ends of the jaw rod can be spaced radially different distances from the axis A.

Figure 2:
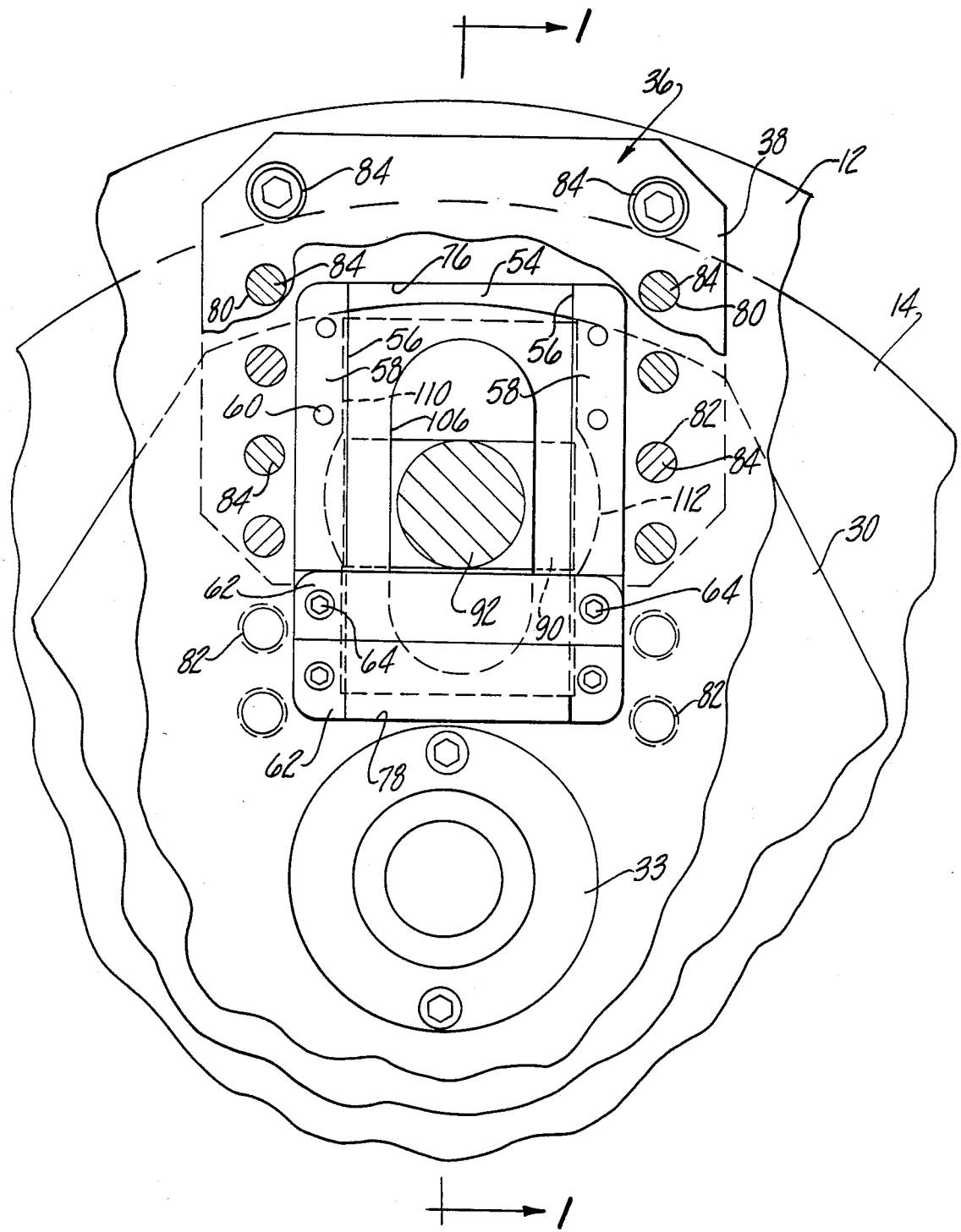
FIG. 2 is a fragmentary front view, with parts broken away, of the chuck illustrated in FIG. 1.

To accommodate each of the jaw assemblies 36, front plate 12 has formed therein a plurality of corresponding openings 54. As shown in FIG. 2, the openings 54 are of rectangular shape and elongated in a direction radially of the chuck body. The circumferentially opposite side edges 56 of openings 54 are recessed to form ledges 58 depressed into the front face 34 of plate 12. Threaded openings 60 are formed through ledges 58 for securing spacer plates 62 on these ledges by means of screws 64. Spacer plates 62 are thin flat plates which are adapted to extend across openings 54. Openings 60 are arranged on ledges 58 so that one or two spacer plates 62 can be arranged across the openings adjacent either the upper or lower end thereof.

The support blocks 38 have a flat rear mounting face 66 adapted to be positioned flatwise against the front face 34 of front plate 12. A radially outer abutment 68 and a radially inner abutment 70 project rearwardly from the mounting face 66 into the opening 54. Abutments 68,70 are located on radially opposite sides of jaw rod 42. Abutment 68 is formed with a flat radially outer face 72 and abutment 70 is formed with a flat radially inner face 74. The width of spacer plates 62 in a direction radially of the chuck body is of the same size and dimensioned in relation to the radial dimension of opening 54 and the radial dimension between the flat faces 72,74 so that, when the support block is positioned against the face 34 of plate 12, the radial dimension between the flat faces 72,74 on abutments 68,70 and the width of the two spacer plates 62 correspond to the dimension between the radially outer edge 76 and the radially inner edge 78 of opening 54.

Along the circumferentially opposite sides thereof support block 38 is formed with a plurality of regularly spaced through openings 80. A similar set of openings 82 is formed in plate 12 so as to register with the openings 80. Openings 80 and openings 82 are spaced apart in a direction radially of the chuck body a distance corresponding to the width of spacer plates 62. The arrangement is such that support block 38 can be shifted radially on the front face 34 of plate 12 such that selected openings 80 in the support block will register with selected openings 82 in plate 12. In the arrangement illustrated in FIGS. 1 and 2 support block 38 is in its radially outermost position wherein the flat radially outer face 72 of abutment 48 engages the radially outer edge 76 of opening 54 and the two spacer plates 62 respectively engage the radially inner face 74 of abutment 70 and the radially inner edge 78 of opening 54. It will be apparent that support block 38 could be shifted to its radially innermost position with the two spacer plates 62 positioned on the radially outer side of abutment 68 or that the support block 38 could be shifted to a radially intermediate position Wherein one of the spacer plates 62 would be located between the radially outer edge 76 of opening 54 and the radially flat face 72 of abutment 68 while the other spacer plate would be located in the position shown in FIGS. 1 and 2 disposed between the edge 78 of opening 54 and the flat face 74 of abutment 70. In any of these positions openings 80 at each side of support block 38 will register with selected openings 82 in the front plate and the support block can be secured to the front face of plate 12 by screws 84.

Figure 3:
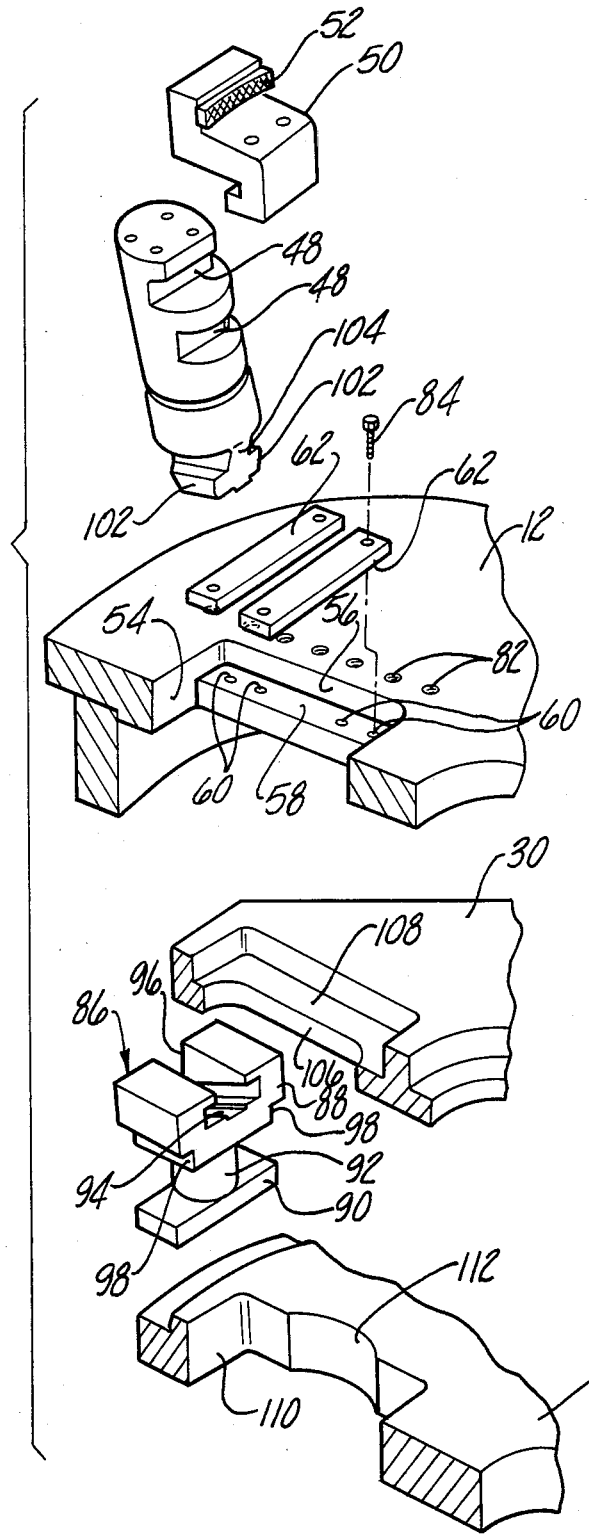
FIG. 3 is a fragmentary exploded view of the chuck.

Each jaw rod 42 is interconnected with puller plate 30 by means of a coupling 86. Coupling 86 is perhaps best illustrated in FIG. 3 and comprises a front block section 88, a rear strap or flange section 90 and a cylindrical neck portion 92 interconnecting these sections. The front block section is formed with an inclined slot 94 communicating with the front face of block section 88 by a straight passageway 96. At each side the rear face of block section 88 is relieved laterally inwardly as at 98. At its axially inner end each jaw rod 42 is beveled as at 100 for clearance and is formed with a pair of laterally outwardly extending tangs 102 connected with the body portion of the rod with a flat neck portion 104 of reduced thickness. Tangs 102 and neck 104 are dimensioned so that they will have a sliding fit with slot 94 and passageway 96 in the block section 88 of coupling 86.

At the location of each coupling 86 puller plate 30 is formed with a radially elongated opening 106, the opening being enlarged adjacent the front face of plate 12 as at 108. Opening 106 has a width slightly greater than the diameter of neck 92 and has an axial dimension only slightly greater than the length of neck 92. The width of the enlarged portion 108 of opening 106 is sufficient to permit the coupling to be rotated 90° from a position wherein the flange or strap section 90 of the coupling extends across and engages the rear face of puller plate 30. The radial dimensions of opening 106 and its enlarged portion 108 are sufficient to accommodate coupling 86 in any of the positions in which the support block 38 may be mounted on the front plate 12.

Figure 4:
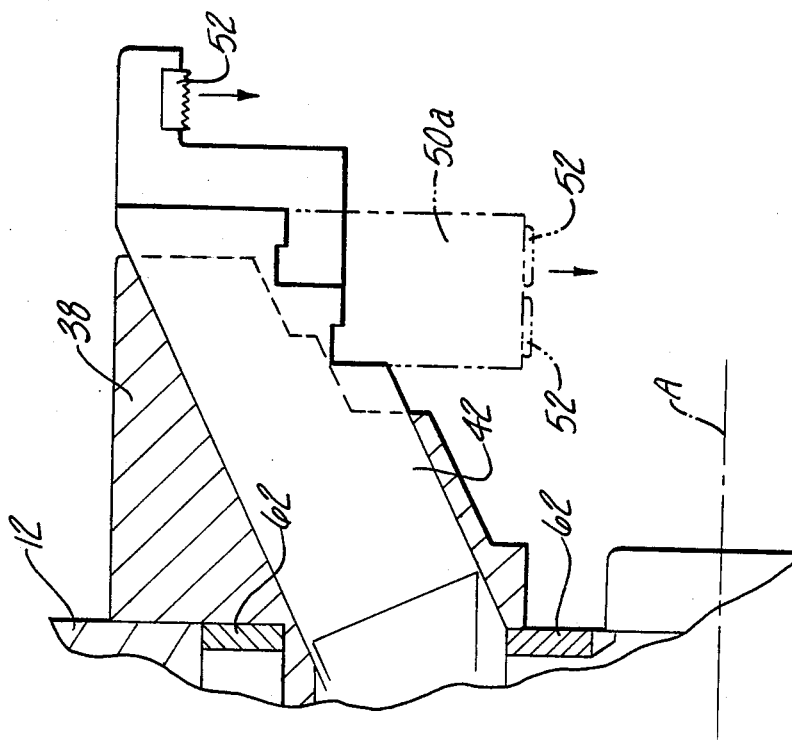
FIG. 4 is a fragmentary vertical sectional view of the chuck illustrating the jaws arranged for engaging the outer diameter of the workpiece.
Figure 5:
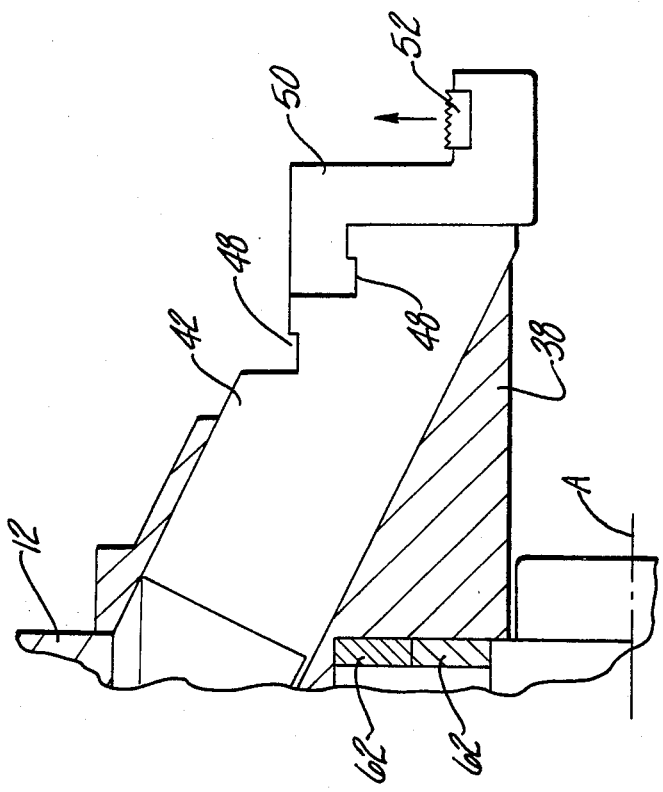
FIG. 5 is a fragmentary vertical sectional view of the chuck illustrating the jaws arranged for engaging the inner diameter of the workpiece.

As is apparent in FIG. 5, the arrangement of openings 80,82 in association with the spacer plates 62 is such that support block 38 can also be mounted on the front face of front plate 12 in a position rotated 180° from the position illustrated in FIGS. 1 and 4. With the support block mounted on the chuck in the manner illustrated in FIG. 5 the jaws 50 can be utilized for gripping a workpiece around an inner diameter thereof. If the chuck is of sufficiently large diameter, support block 38 can be mounted in radially different positions even when it is inverted on the face of front plate 12, as shown in FIG. 5.

From the above described arrangement it will be appreciated that when the puller plate 30 is retracted to the left from the position shown in FIG. 1 each jaw rod 42 will be shifted axially inwardly of the chuck at an angle inclined to the axis A and the inserts 52 on each jaw 50 will be displaced radially inwardly to grip the outer diameter of a workpiece. The sliding connection between the tangs 102 at the inner end of the jaw rod and the slot 94 in coupling 86 and the sliding connection between coupling 86 and puller plate 30 enables the jaw rods 42 and the puller plate 30 to be displaced in the manner described. To permit retraction of puller plate 30 with the strap section 90 of coupling 86 engaged with the rear face of the puller plate, the rear plate 14 is formed with a plurality of radially elongated holes 110 having the radially central portion thereof enlarged as at 112 to permit the coupling to be rotated 90° when it is desired to disassemble the jaw assembly from the chuck.

It will be apparent that by reason of the fact that support block 38 can be mounted on front plate 12 at a plurality of positions spaced radially different distances from the axis A of the chuck, the fact that it can also be mounted on the chuck in an inverted position such as shown in FIG. 5 and the fact that the jaws can be mounted at different radial positions on the ends of the jaw rods, a particular chuck can be used for gripping workpieces which vary considerably in size on either its inner or outer diameter. Furthermore, it will be appreciated that the support blocks 38 can be moved from one radial position to another or even inverted without disassembling the front plate 12 from the rear plate 14. For example, if it is desired to invert the support blocks 38, that is, mount them in a position rotated 180° from their previous position, it is only necessary to remove screws 84, remove spacer plates 62 and then rotate jaw rod 42 90° so that the width dimension of the flange or strap section 90 of coupling 86 registers with the opening 106 in puller plate 30. When strap section 90 registers lengthwise with the elongated opening 106 the entire jaw assembly with the coupling 86 connected thereto can be retracted forwardly through the opening 106 in puller plate 30 and the opening 54 in front plate 12. In any event, if the screws 84 are removed and the spacer plates 62 are removed, support block 38 can be shifted radially to a position wherein it can be entirely withdrawn in a forward direction from over jaw rod 42.

We claim:

1. A chuck adapted to be mounted on the spindle of a machine tool for rotatably supporting a workpiece, comprising: a body having a central axis, said body having a front plate and a back plate rigidly connected together in axially spaced relation to define a chamber therebetween, said front plate having a plurality of circumferentially spaced openings therein, a plurality of individual support blocks fixedly mounted on said front plate and overlying each opening, each support block having a bore extending therethrough at an acute angle to said central axis, each block being adapted to be mounted on said front plate at a plurality of positions spaced radially different distances from said axis, each opening in the front plate being of sufficient radial extent to register with the rear end of said bore in each of said radially different positions, each support block having a jaw rod mounted in said bore for sliding movement therein, the outer end portion of each jaw rod having a workpiece-gripping jaw thereon, the inner end portion of each jaw rod extending through an associated one of said openings in the front plate, a puller plate in said chamber displaceable axially of said body, means for axially displacing the puller plate, said puller plate having a plurality of openings therein registering circumferentially with the openings in the front plate and with the inner ends of the jaw rods, and a plurality of individual couplings each slideably connected at one end with the inner end of a jaw rod and at its other end slideably connected with the puller plate to cause the outer ends of the jaws to shift radially in response to axial displacement of the puller plate, each coupling extending through an associated one of said openings in the puller plate and being connected with the puller plate at said last-mentioned opening, the puller plate openings having a radial extent sufficient to accommodate connection with the coupling for each of said radially adjusted positions of the support blocks.

2. A chuck as called for in claim 1 wherein each support block has a mounting flange positioned against the front face of the front plate, said mounting flange and said front plate having a plurality of holes therein for accommodating mounting screws, the holes being regularly spaced apart radially so that the screw holes in the mounting flange are adapted to register with screw holes in the front plate when the support block is shifted radially to said different positions.

3. A chuck as called for in claim 2 wherein the screw holes in the face plate are arranged in a plurality of circumferentially aligned pairs, the screw holes in each pair being located on circumferentially opposite sides of each of the openings in the front plate, all of the holes at one side of each opening in the front plate being spaced circumferentially equal distances from the holes in the other side of each opening, the holes in the mounting flange of the support block being located in the same arrangement as the holes in the front plate to thereby enable the support block to be mounted on the front plate in either of two positions rotated 180° with respect to each other so that in one position the jaw rods incline radially outwardly in a forward direction and in the other position the jaw rods incline radially inwardly in a forward direction.

4. A chuck as called for in claim 1 wherein each support block has a mounting flange positioned against the front face of the front plate and a pair of abutments projecting rearwardly from said flange into the associated opening in the front plate, said abutments being spaced apart radially of the front plate on diametrically opposite sides of the inner end of said bore a distance less than the radial dimension of the associated opening in the front plate and rigid spacers filling the radial clearance space between said abutments and the adjacent radial extremities of the opening in the front plate when the support block is positioned at each of said radially different locations.

5. A chuck as called for in claim 4 wherein the opposed radial extremities of each opening in the front plate and the edges of said abutments extend substantially perpendicular to a radial line on the chuck body intersecting the longitudinal axis of the jaw rod.

6. A chuck as called for in claim 5 wherein the spacers are equal in width and each has a width comprising a fraction of the difference between the distance between said abutments and the radial dimension of the openings in said front plate.

7. A chuck as called for in claim 1 wherein the inner end of each jaw rod has a pair of diametrically opposed grooves thereon which extend generally radially of the chuck body in a plane perpendicular to the axis of the inclined jaw rod, said one end of each coupling having diametrically opposed tangs thereon slideably engaging the grooves in the associated rod to permit the coupling to shift radially in a plane perpendicular to the central axis of the chuck body, said puller plate lying in a plane perpendicular to the central axis of the chuck body, said other end of each coupling being connected with said one end by a neck which extends through the associated opening in the puller plate, said other end of each coupling comprising a flange lying in a plane perpendicular to the axis of said body and engaging the rear face of the puller plate on circumferentially opposite sides of the associated opening therein.

* * * * *